(12) United States Patent
Moriwaki et al.

(10) Patent No.: US 6,399,695 B1
(45) Date of Patent: Jun. 4, 2002

(54) THERMOPLASTIC POLYESTER RESIN COMPOSITION

(75) Inventors: Takeshi Moriwaki; Toshiharu Sakaguchi, both of Osaka (JP)

(73) Assignee: Kishimoto Sangyo Co., Ltd., Osaka (JP)

( * ) Notice: Subject to any disclaimer, the term of this patent is extended or adjusted under 35 U.S.C. 154(b) by 0 days.

(21) Appl. No.: 09/107,419

(22) Filed: Jun. 30, 1998

(30) Foreign Application Priority Data

Jun. 30, 1997 (JP) .............................................. 9-190637

(51) Int. Cl.$^7$ ................................................ C08L 67/02
(52) U.S. Cl. ........................... 524/504; 525/286; 525/64
(58) Field of Search ..................... 525/64, 286; 524/504

(56) References Cited

U.S. PATENT DOCUMENTS

| | | | |
|---|---|---|---|
| 4,172,859 A | * 10/1979 | Epstein ......................... | 525/109 |
| 4,855,355 A | * 8/1989 | Hirai ............................. | 525/64 |
| 4,948,842 A | * 8/1990 | Olivier ......................... | 525/286 |
| 5,128,202 A | 7/1992 | Subramanian et al. | |
| 5,272,236 A | * 12/1993 | Lai .......................... | 526/348.5 |
| 5,371,142 A | * 12/1994 | Nishikubo ..................... | 525/67 |

FOREIGN PATENT DOCUMENTS

| | | |
|---|---|---|
| EP | 0 640 650 A1 | 3/1995 |
| EP | 0 653 461 A2 A3 | 5/1995 |
| EP | 0 722 983 A1 | 7/1996 |
| EP | 0 866 081 A1 | 9/1998 |
| JP | 62-260856 | 11/1987 |
| JP | 04-359959 | 12/1992 |
| JP | 6298991 | 10/1994 |
| JP | 09-087476 | 7/1996 |
| JP | 9-87476 | * 3/1997 |
| WO | WO 88/05452 | 7/1988 |
| WO | WO 97/21745 | 6/1997 |

OTHER PUBLICATIONS

*Properties of Graft Modification Polyolefin Elastomers in Blends and Alloys*, M. Hughes and H. Silvis, ANTEC '95, pp. 2287.

* cited by examiner

*Primary Examiner*—Patricia A. Short
(74) *Attorney, Agent, or Firm*—Armstrong, Westerman & Hattori, LLP

(57) ABSTRACT

The purposes of the present invention are to provide highly impact-resistant thermoplastic polyester resin inexpensively and promote the recycling of PET bottles, which are dumped as waste. To attain the purposes, a carboxyl-modified metallocene catalyzed polyolefin elastomer or a glycidyl methacrylate adduct to the elastomer is melt-blended with a thermoplastic polyester resin, particularly, the powder of recycled PET bottles. Additionally, a filler can be mixed, if necessary.

1 Claim, 6 Drawing Sheets

MOLECULAR WEIGHT DISTRIBUTION
(GPC CHART)

DSC MELTING POINT
AND DENSITY

LONG SIDE CHAIN

THERMOPLASTIC POLYESTER RESIN COMPOSITION

TECHNICAL FIELD

The present invention relates to a thermoplastic polyester resin composition, and more particularly to a thermoplastic polyester resin composition wherein a modified polyolefin elastomer is used as a modifier.

BACKGROUND ART

When compared with other industrial materials such as glass, metals, wood, concrete, thermoplastic polyester resin compositions have various features such as inexpensiveness lightness, high specific strength, high chemical stability, high moldability. and therefore they are widely used for industrial products, domestic utensils and parts of both.

Under the recent development of industry and technology, various techniques have been developed and studied to improve the properties and qualities of the compositions by reinforcement means with glass fibers or filers and/or various polymer alloy technologies.

Polyethylene terephthalate (hereinafter referred to as 'PET'), a kind of thermoplastic polyester resin, is superior in heat resistance, chemical resistance, mechanical characteristics and electric characteristics, additionally transparency and barrier ability whereby it is widely used for bottles and packaging material for food.

However, one of the shortcomings of PET is inferiority in impact resistance, and thereby the uses of PET as a material for injection molding is markedly limited. In fact, only glass fiber reinforced materials are practically used as a material for injection molding.

Therefore, improvement of PET's properties by inexpensive and easy means is expected in order to overcome the limited uses of PET as a molding material. If such techniques are developed, the uses of thermoplastic polyester resin will be widened to electric home appliances, construction materials, automobile parts and the like.

Another problem is that a large number of various PET bottles being dumped by industries etc. have few uses for recycling due to the reasons mentioned above, although it is possible to collect them.

In particular, it is a big problem that recycled PET bottles have few uses, although collecting the bottles is easy and safe, and the bottles are high in purity as a raw material since they are originally vessels for drinks and the like.

DISCLOSURE OF THE INVENTION

The present invention has been intended to achieve the above-mentioned purposes.

The inventors of the present invention developed a carboxyl-modified metallocene catalyzed polyolefin elastomer (polyolefin elastomer polymerized by using a metallocene catalyst) and a glycidyl methacrylate adduct to the elastomer for inexpensive and easily manufacturable modifier of a thermoplastic polyester resin, and thereby developed a novel thermoplastic polyester resin which is superior in impact resistance.

The present invention thus increases the uses for recycled thermoplastic polyester resins.

Additionally, the inventors succeeded in developing a thermoplastic polyester resin wherein inorganic fillers are mixed.

The present invention is embodied in accordance with the following constitutions and particulars.

The invention according to Claim 1 is a thermoplastic polyester resin composition comprising 90 to 60 parts by weight of a thermoplastic polyester resin and 10 to 40 parts by weight of a carboxyl-modified metallocene catalyzed polyolefin elastomer.

The above-mentioned composition improves a thermoplastic polyester resin markedly in its mechanical characteristics.

The invention according to Claim 2 is the thermoplastic polyester resin composition according to Claim 1, wherein the aforementioned thermoplastic polyester resin is polyethylene terephthalate.

The above-mentioned composition provides a highly impact-resistant thermoplastic polyester resin composition, wherein polyethylene terephthalate, which is frequently used for PET bottles, is the main material.

The invention according to Claim 3 is the thermoplastic polyester resin composition according to Claim 2 wherein the aforementioned metallocene catalyzed polyolefin elastomer is ethylene.α-olefin copolymer hating 5 to 30 wt. %, based on the weight of the ethylene, of α-olefin comonomer and the basic structure (repeating unit) of the elastomer is $[CH_2-CH_2]_n.[CH_2-CHR]_m$ (R is a side chain represented in $CH_3.[CH_2]_L$, L is 3 to 8 inclusive.).

The above-mentioned composition improves impact resistance of a thermoplastic polyester resin since the elastomer comprises the side chains with an appropriate length. Moreover, appropriate flexibility of the resins is attained.

The invention according to Claim 4 is a filled (inorganic-filler-mixed) thermoplastic polyester resin composition comprising 100 parts by weight of the thermoplastic polyester resin composition according to Claims 3 and 10 to 500 parts by weight of an inorganic filler.

The above-mentioned composition improves a thermoplastic polyester resin composition markedly in its mechanical strength, such as its flexural modulus, by the action of the inorganic or mineral filler. In addition, the mixing of a thermoplastic polyester resin composition and an inorganic filler is rendered easy and uniform since the mixing ratio of the composition and the filler is appropriate. Furthermore, the polyolefin elastomer is improved in interfacial contact with the inorganic filler and thereby retains even more preferable mechanical characteristics since the whole elastomer is modified with an acid uniformly.

The invention according to Claim 5 is the thermoplastic polyester resin composition according to Claim 4, wherein a carboxyl-modified metallocene catalyzed polyolefin elastomer is modified with 0.01 to 1.0 wt. %, based on the weight of the elastomer, of maleic anhydride or maleic acid.

The above-mentioned composition enables the whole metallocene catalyzed polyolefin elastomer to be uniformly modified with an acid under the limited conditions, and therefore the elastomer is improved in the bonding with a thermoplastic polyester resin and inorganic fillers. In addition, with the use of a twin-screw extruder, it is possible to facilitate the acid modification of the polyolefin elastomer and the mixing of the elastomer with a thermoplastic polyester resin and additionally an inorganic filler.

The inventions according to Claims 6 to 8 are the inventions wherein the invention according to Claim 2 is combined with the inventions according to Claims 4 and/or 5.

The invention according to Claim 9 is the thermoplastic polyester resin composition according to Claim 1, wherein the aforementioned thermoplastic polyester resin is a mixture of polyethylene terephthalate and polybutylene terephthalate at a weight ratio of from 95:5 to 5:95.

The above-mentioned composition provides a highly impact-resistant thermoplastic polyester resin composition, wherein the main material is the mixture of polyethylene terephthalate and polybutylene terephthalate at a wide range of weight ratios of from 95:5 to 5:95 in consideration of flowability, moldability and heat resistance depending on its uses.

The inventions according to Claims 10 to 15 are the inventions according to Claims 3 to 8, wherein the mixture of polyethylene terephthalate and polybutylene terephthalate is used in place of the polyethylene terephthalate in the inventions according to Claims 3 to 8, in correspondence to the difference between the invention according to Claim 9 and the invention according to Claim 2.

The invention according to Claim 16 is a thermoplastic polyester resin composition comprising 90 to 60 parts by weight of a thermoplastic polyester resin and 10 to 40 parts by weight of a glycidyl methacrylate adduct to a metallocene catalyzed polyolefin elastomer.

The above-mentioned composition provides a highly impact-resistant thermoplastic polyester resin composition comprising 90 to 60 parts by weight of thermoplastic polyester resin and 10 to 40 parts by weight of the glycidyl methacrylate adduct to a metallocene catalyzed polyolefin elastomer which is excellent in impact resistance.

The inventions according to Claims 17 to 30 are the inventions according to Claims 2 to 15, wherein the glycidyl methacrylate adduct is used in place of a carboxyl-modified metallocene catalyzed polyolefin elastomer in the inventions according to Claims 2 to 15 in correspondence to the difference between the invention according to Claim 16 and the invention according to Claim 1.

DETAILED DESCRIPTION OF THE PREFERRED EMBODIMENTS

The presuppositional techniques and equipment for carrying out the present invention are described in the following details.

Metallocene Catalyst

The metallocene catalyst herein is a catalyst wherein the qualities of the coexistent active sites are uniform. The catalyst is a compound which holds a transition metal between unsaturated cyclic compounds in the chemical structure (metallocene), and therefore called a metallocene catalyst or a single-site catalyst. Since active sites with different qualities do not coexist in the catalyst, it is possible to produce a uniform polymer with a small distribution of molecular weight and a polymer with an arbitrary regularity corresponding to the symmetry of ligand.

Figure 1:
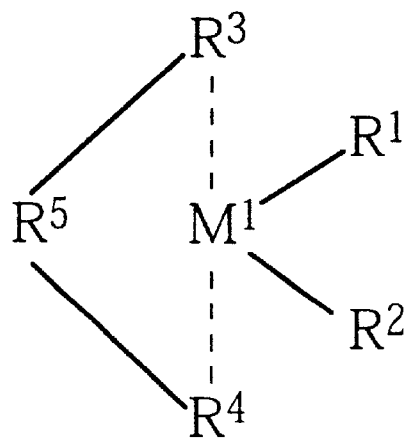
FIG. 1 is an example of a metallocene catalyst.

Specifically, the catalyst has a structure as shown in FIG. 1.

The catalyst in FIG. 1 is called a metallocene complex. A composite catalyst wherein the metallocene complex shown in FIG. 1 is combined with the compound shown in FIG. 2 (aluminoxane) can also be listed.

In FIG. 1, $M^1$ is Ti, Zr, Hf, V, Nb or Ta. $R^1$ and $R^2$ may be the same as or different from each other, and represent hydrogen atom halogen atom. an alkyl group having 1 to 10C (carbon atom). an alkoxyl group having 1 to 10C, an aryl group having 6 to 10C, an alkenyl group having 6 to 10C, an alkenyl group having 2 to 10C, an arylalkyl group having 7 to 40C, an alkylaryl group having 7 to 40C or an arylalkenyl group having 8 to 40C. $R^3$ and $R^4$ are the same as or different from each other, and represent a residual group of mononuclear or polynuclear hydrocarbon which can form a complex having a sandwich structure with central metal atom $M^1$.

Figure 2:
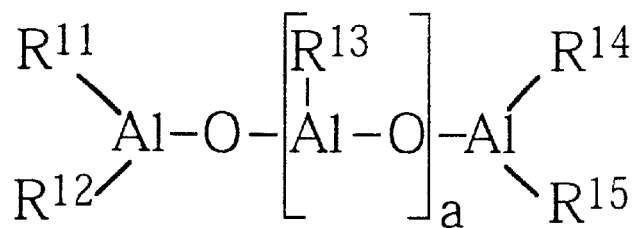
FIG. 2 is an example of aluminoxane compound which is used in combination with a metallocene compound as a composite catalyst.

$R^5$ is $=BR^6$, $=AlR^6$, $—Ge—$, $—Sn—$, $—O—$, $—S—$, $=SO$, $=SO_2$, $=NR^6$, $=CO$, $=PR^6$ or $P(O)R^6$ (wherein $R^6$ is hydrogen atom or halogen atom.). In FIG. 2, $R^{11}$ to $R^{15}$ may be the same as or different from each other, and represents 1 to 6C alkyl group, 1 to 6C fluoroalkyl group. 6 to 18C aryl group, 6 to 18C fluoroaryl group or hydrogen atom. a is an integer of 0 to 50 inclusive.

Figure 3:
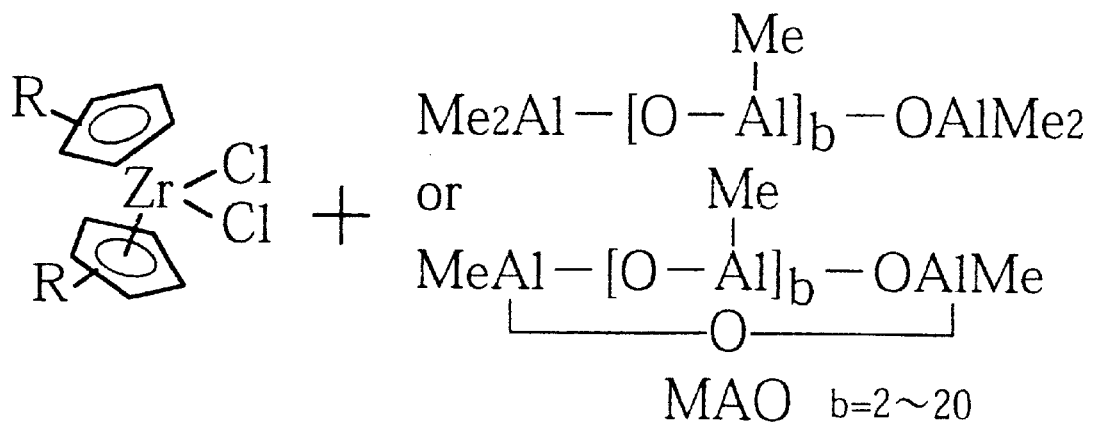
FIG. 3 is another example of a metallocene catalyst, an example of a composite catalyst.

FIG. 3 shows an example of a composite catalyst comprising the compounds shown in FIGS. 1 and 2. The details of the catalyst will not be given herein since the catalyst is a publicly known art which is disclosed. for example, in PACKPIA, No. 4. pp.12–53, 1994, as well as in Japanese Unexamined Patent Publications No. 5-140227, No. 5-140228, No. 5-209019 and the like.

A Metallocene Catalyzed Polyolefin Elastomer

Figure 4:
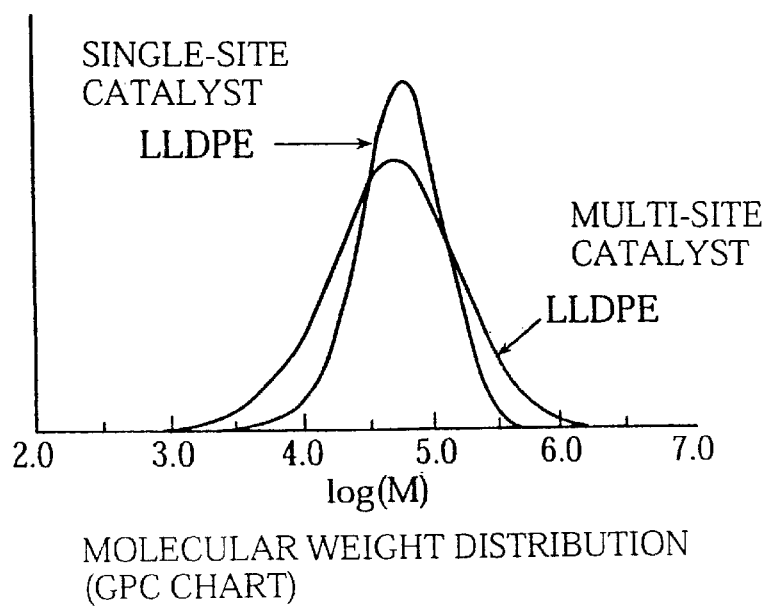
FIG. 4 is a graph showing the difference in molecular-weight distribution between a polyolefin elastomer polymerized by using a metallocene catalyst (single-site catalyst) and a polyolefin elastomer polymerized by using a conventional catalyst.

A metallocene catalyzed polyolefin elastomer polymerized by using the above-mentioned metallocene catalyst has a distinct melting point and glass transition temperature as well as no tackiness because of a narrow molecular weightdistribution, homogeneity and even molecular weight as shown in the molecular-weight distribution graph (FIG. 4).

Figure 5:
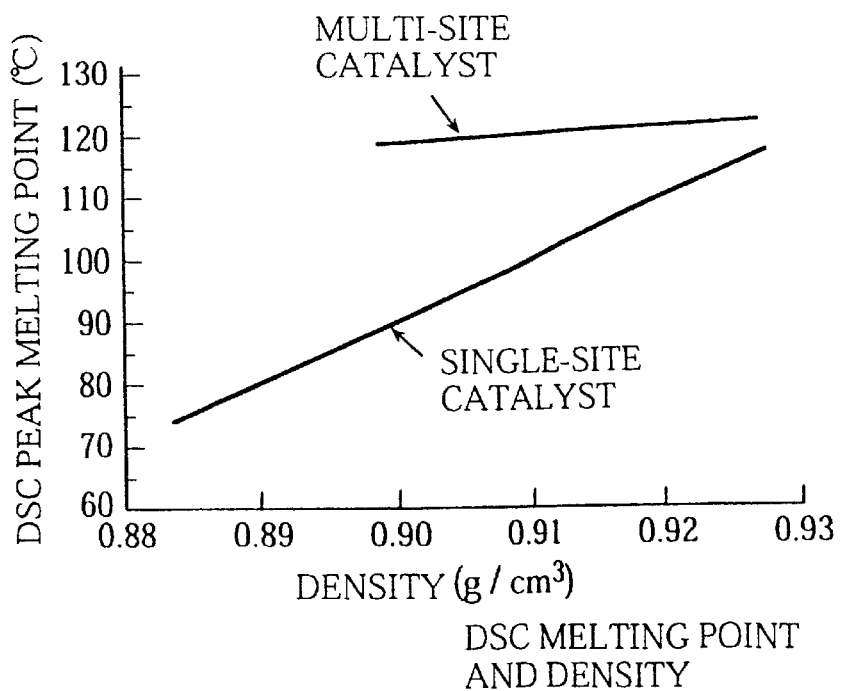
FIG. 5 is a graph showing the difference in DSC-method melting point and density between a polyolefin elastomer polymerized by using a metallocene catalyst (single-site catalyst) and a polyolefin elastomer polymerized by using a conventional catalyst.

In the figures, the multisite catalyst is a conventional catalyst. FIG. 5 shows how the DSC-method melting point and density differ in both catalysts. The metallocene catalyzed polyolefin elastomer. which is essential to the present invention, comprises 5 to 30 wt. % of α-olefin comonomer to ethylene and the side chains with 6C in Examples. In the present state of the art (at the time of the application), the elastomer is produced by using a geometrically constrained catalyst among the metallocene catalysts. A geometrically constrained catalyst is a coordination metal complex in which a metal atom or ion is bonded to a delocalized substitution π bond site to form a constrained geometry around the metal atom or ion. More particularly, it is a composite catalyst as shown in FIG. 3, wherein a compound having cyclopentadiene molecules as the ligand (zirconocene dichloride), which is shown on the left side in FIG. 3, is combined with an aluminoxane compound, which is shown on the right side in FIG. 3.

Figure 6:
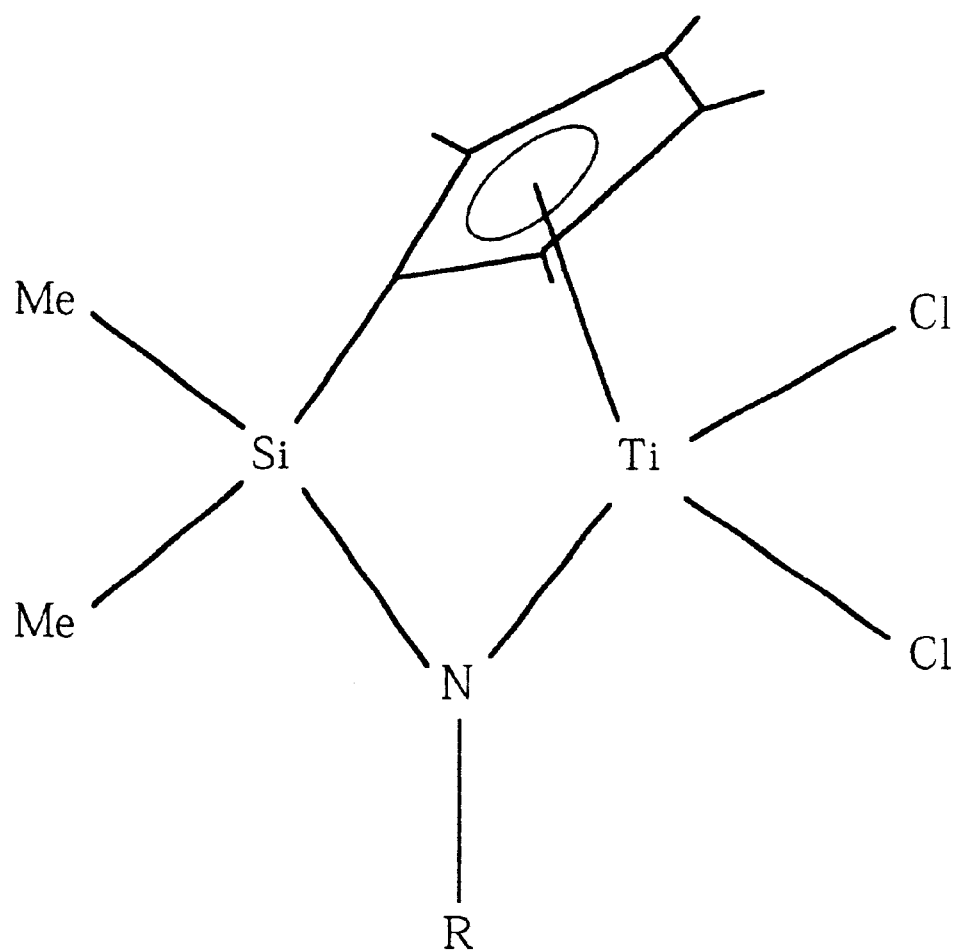
FIG. 6 is an example of the chemical structures of a geometrically constrained catalyst.

Another example is shown in FIG. 6.

The more detailed description of the catalyst will not be given herein since the catalyst is a publicly known art which is disclosed on pp. 10 of *JAPAN PLASTICS*, No. 2, Vol. 47, as well as Japanese Unexamined Patent Publications No. 7-500622, No. 7-53618, etc.

Figure 7:
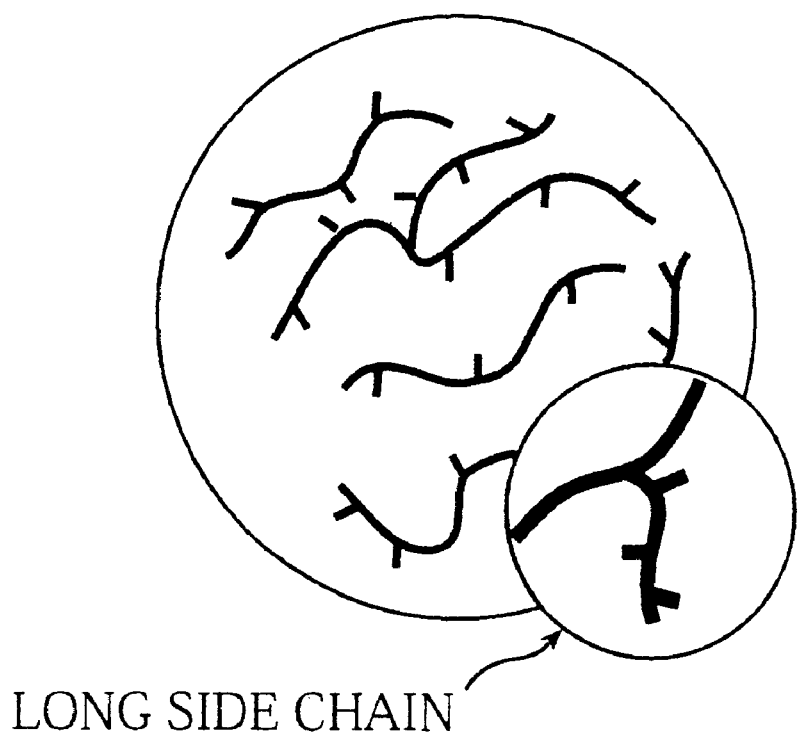
FIG. 7 is a model view showing a main chain having long branched chains with a length close to the main chain in a metallocene catalyzed polyolefin elastomer.
Figure 8:
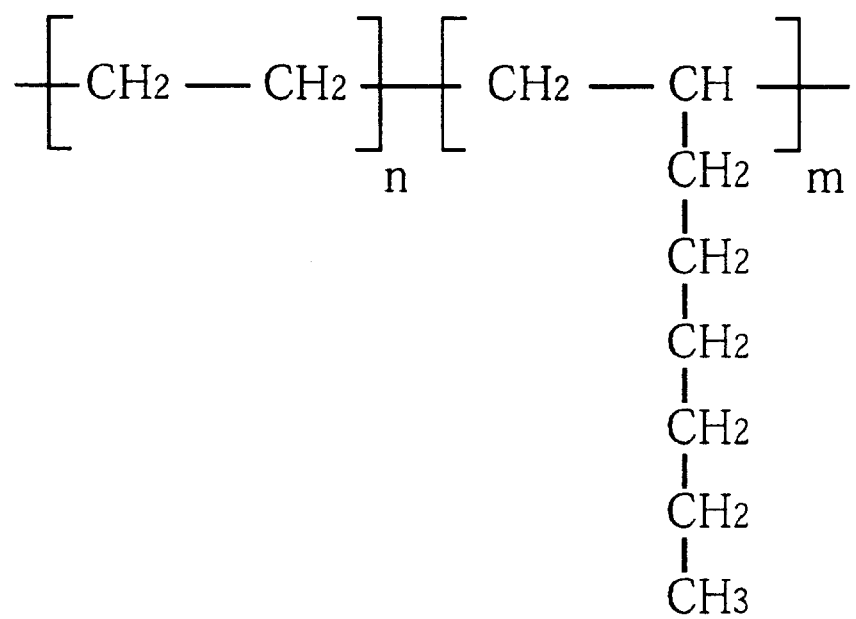
FIG. 8 is a view showing the basic structure of a main chain in a metallocene catalyzed polyolefin elastomer.

A polyolefin elastomer produced by using the geometrically constrained catalyst has high moldability in addition to the general characteristics particular to a polyolefin elastomer produced by using a metallocene catalyst, because long branched chains are selectively introduced to a main chain. The model constitution is shown in FIG. 7 and the basic structure of the main chain is shown in FIG. 8. As shown in FIG. 8, the side chain has 6C.

In Japan, the polyolefin elastomer is commercially available from Du Pont Dow Elastomer, Inc. under the trade name of ENGAGE. The physical property values of ENGAGE 8200, a kind among the various kinds of ENGAGEs with the grades for general uses (the density is 0.885 to 0.870 g/cc) are roughly as follows:

The density is 0.87 g/cc, the ratio of comonomer is 24 wt. %, the melt index is 5 (g/10 min.), the tensile strength is 72 kg/cm$^2$, the 100% tensile modulus is 22 kg/cm$^2$, the extensibility is 980%, the shore hardness is 75 (A) and 26 (D), the DSC melting point (peak) is 68° C.

Various kinds of ENGAGEs with high density grade (0.895 to 0.910 g/cc) are also available. The more detailed description of the polyolefin elastomer will not be given herein since the polyolefin elastomer is a publicly known art disclosed not only in the catalogs of the corporation but also on pp. 76–77 *Polyfile*, August 1996, etc.

The Acid Modification of a Polyolefin Elastomer

It has been well known for long that, by modifying polypropylene, polyethylene, ethylene propylene rubber (EPR), ethylene propylene diene methylene (EPDXI) and the like with an acid, polar groups are added to those matters, and the compatibility of those matters with nylon etc. is thus improved.

However, it has been considered that the metallocene catalyzed polyolefin elastomer can not be modified with an acid since the bridges are easily caused by the action of peroxides or the irradiation of radioactive rays. The elastomer can not therefore be used as a modifier for PET and the like (impact modifier) and its uses have been limited in the uses with polyolefin-based plastics in consideration of compatibility.

Nevertheless, the inventors succeeded in modifying the elastomer with an acid under the limited conditions detailed below and thus completed to produce a thermoplastic polyester resin with far higher impact resistance than that of conventional materials by mixing the resin with the modified elastomer.

Maleic acid, acrylic acid. methacrylic acid. fumaric acid, itaconic acid, citraconic acid and anhydrides of these acids are among the acids usable for the acid modification of the polyolefin elastomer. Among them, maleic anhydride is preferable because of its two functional groups and inexpensiveness. The reason why the anhydride is preferable is that the monomer reactivity is high and the grafting is easy in view of steric hindrance, polar factor and the like.

An organic peroxide which decomposes at an appropriate speed at the melting temperature of the elastomer are used as an initiator for the grafting Lauroyl peroxide, di-tert-butyl peroxide, 1,3-bis (t-butylperoxyisopropyl) benzene, benzoyl peroxide, tert-butyl perbenzoate, dicumyl peroxide or the like are used as the organic peroxide.

The process of acid modification of a polyolefin-based elastomer is described below.

Figure 9:
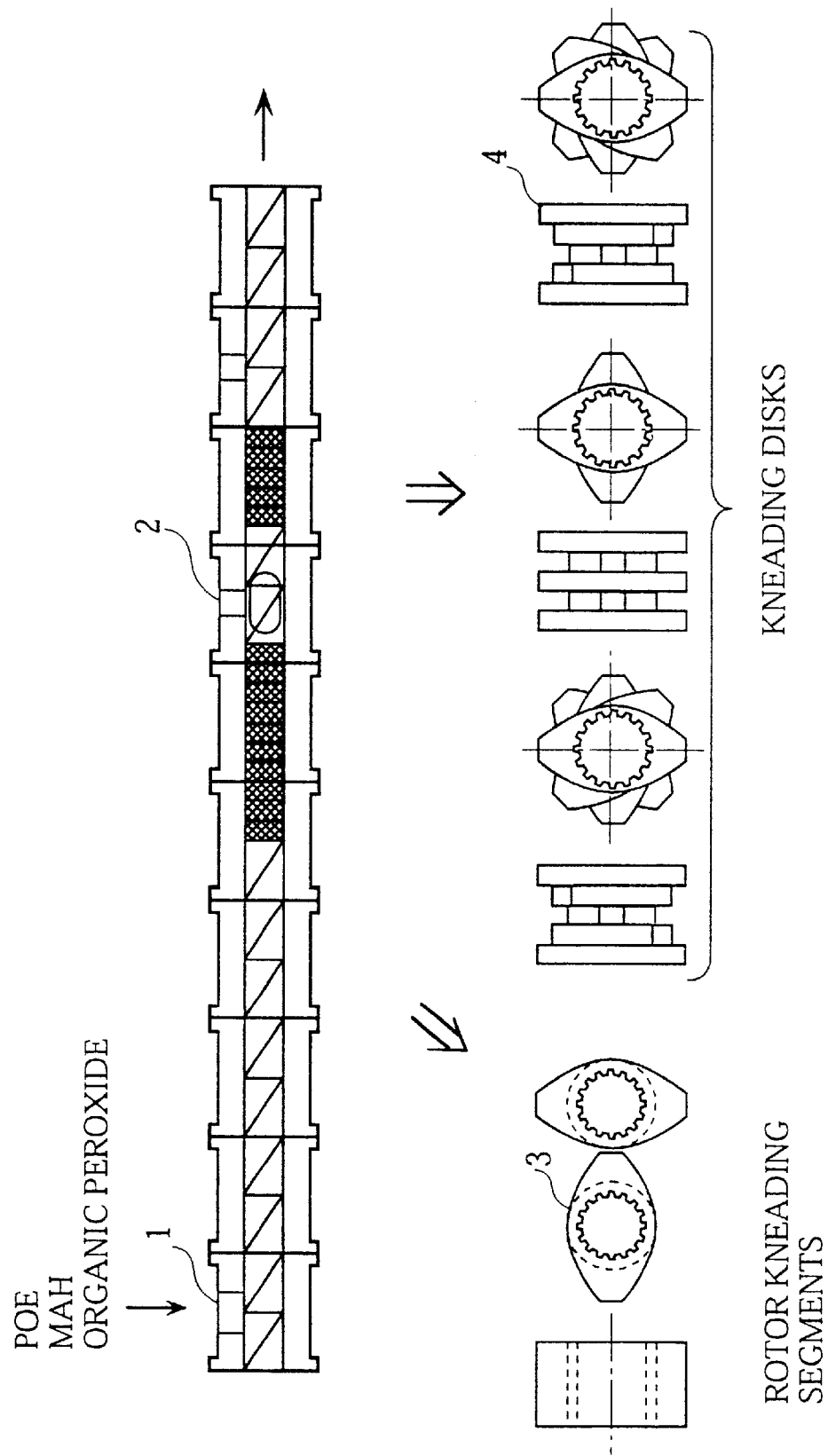
FIG. 9 is a schematic view showing the acid modification of a metallocene catalyzed polyolefin elastomer and the glycidyl methacrylate addition to the elastomer and the production of a thermoplastic polyester resin composition with the use of a twin-screw kneader.

Single screw extruders, twin-screw extruders, kneaders and the like are usable for the process. Among them, a twin-screw extruder equipped with a kneading mechanism such as rotor type kneading segments or kneading discs as shown in FIG. 9 is preferable. In FIG. 9, the twin-screw extruder comprises an upper feeding port (1), a downstream feeding port (2), rotor type kneading segments (3) and kneading discs (4). Only the upper feeding port (1) is used herein. After the inside of the extruder's cylinder is heated to the temperature at which the polyolefin elastomer can melt and the organic peroxide can act, pellets of the elastomer, maleic anhydride and organic peroxide, each with a predetermined quantity, or the prepared mixture of the aforementioned three matters each with a predetermined quantity is consecutively provided into the upper feeding port of the extruder through the hopper. The quantity of the maleic anhydride is 0.01 to 1.0 wt. % to the elastomer, preferably 0.05 to 0.2 wt. % to the elastomer. The reason is that less quantity of the maleic anhydride than the above range results in insufficient compatibility, while more quantity results in such undesirable phenomena that the effect of the compatibility improvement reaches its limit, the bridges of molecules occur and the elastomer can not be uniformly dispersed and mixed in a thermoplastic polyester resin, flowability in molding is hindered and the appearance of molded products is spoiled.

The examples described later will detail the significant effects of the acidmodified polyolefin elastomer thus produced to the present invention.

The Adding of Glycidyl Methacrylate to a Polyolefin Elastomer

The process of the addition of glycidyl methacrylate to a polyolefin elastomer, which is another constituent in the present invention, is described below.

The preferable equipment for this process is the same as used in the above-mentioned acid modification. likewise only the upper feeding port (1) is used.

After the inside of the extruder's cylinder is heated to the temperature at which the polyolefin elastomer can melt and the organic peroxide can act, the prepared mixture comprising pellets of the elastomer, glycidyl methacrylate and organic peroxide, each with a predetermined quantity, is consecutively provided into the upper feeding port of the extruder through the hopper. The quantity of the glycidyl methacrylate is 0.01 to 1.0 wt. % to the elastomer, preferably 0.05 to 0.2 wt. % to the elastomer. The reason is that less quantity of the glycidyl methacrylate than the above range results in insufficient compatibility, while more quantity results in such undesirable phenomena that the effect of the compatibility improvement reaches its limit, the bridges of molecules occur and the elastomer can not be uniformly dispersed and mixed in the thermoplastic polyester resin, flowability in molding is hindered and the appearance of molded products is spoiled.

The examples described later will detail the significant effects of the glycidyl-methacrylate-added polyolefin elastomer thus produced to the present invention.

A Thermoplastic Polyester Resin

In view of waste disposal, it is preferable that the pulverized materials derived from used PET bottles are employed as a thermoplastic polyester resin for a main material of a thermoplastic polyester resin composition, although the pulverized materials have various weight ratios of polyethylene terephthalate and polybutylene terephthalate.

Inorganic Fillers

It is preferable that inorganic fillers are surface-treated beforehand by 0.01 to 0.5 wt. % of silane coupling agent, or stearic acid or metallic salt of the acid is uniformly applied onto the surface in order to further improve the interfacial adhesion of the inorganic fillers to a carboxyl-modified polyolefin elastomer. The materials are 0.1 to 10 l in particle size of calcium carbonate, talc, mica, silica, kaolin, clay, wollastonite, potassium titanate, barium sulfate, magnesium hydrate or glass beads and the like. Generally, 10 to 200 parts by weight, preferably 50 to 200 parts by weight, of the inorganic fillers is mixed with 100 parts by weight of a thermoplastic polyester resin.

Iron powder, copper powder or brass powder is used to obtain molded products with a high specific gravity, and ferrite is used for plastic magnets. In these cases, 100 to 500 parts by weight of the inorganic fillers is mixed with 100 parts by weight of a thermoplastic polyester resin.

The Producing and Kneading of a Thermoplastic Polyester Resin Composition

A thermoplastic polyester resin composition of the present invention can be produced by melting and kneading the mixture of polyester resin powder and a polyolefin elastomer modified with a carboxylic acid with the use of extruders. The composition can be easily produced by using an ordinary single or twin-screw extruder. A single screw extruder is often equipped with Dulmage type kneading screws and barrier flight (Maddock) type screws in order to reinforce the effect of kneading, and such extruders may also be used.

As a process to effectively produce a thermoplastic polyester resin composition of the present invention, it is possible to employ the method of modifying a polyolefin elastomer with an acid by using a twin-screw extruder and providing a the thermoplastic polyester resin into the second material feeding port placed at the midstream of the same extruder. In this method, it is preferable to install rotor type kneading segments or disc type kneading blocks in the second step. In this case, maleic anhydride and organic peroxide are entirely exhausted in the upper part of the extruder, and therefore they do not give any bad effects to polyethylene terephthalate.

The melting and kneading are normally carried out at a temperature of around 260° C.

EXAMPLES

A thermoplastic polyester resin composition of the present invention is illustrated by the following examples.

Raw Materials

Thermoplastic Polyester Resin

Pulverized flakes of used PET bottles manufactured by With PET Bottle Recycle, Inc.

Metallocene Catalyzed Polyolefin Elastomer (POE)

ENGAGE 8200 manufactured by Du Pont Dow Elastomer, Inc.

As found in FIG. 5, a DSC-method melting point of ENGAGEs can be selected within a certain range corresponding to the matter compatible with it. ENGAGE 8200 was used in the examples herein.

In the examples, the conditions were as follows.

1. Acid Modification of POE 100 parts by weight of polyolefin elastomer ENGAGE 8200, 0.2 parts by weight of maleic anhydride (pulverized below 1 mm) and 0.1 parts by weight of 1,3-bis(t-butylperoxyisopropyl)benzene were mixed uniformly by a drum blender.

2. Adding of Glycidyl Methacrylate to POE (1) 100 parts by weight of polyolefin elastomer: ENGAGE 8200, 0.2 parts by weight of glycidyl methacrylate: Blenmer G manufactured by Nippon Oil & Fats, Inc. and 0.1 parts by weight of di-tert-butyl peroxide were mixed uniformly by a drum blender.

(2) 100 parts by weight of polyolefin elastomer: ENGAGE 8200, 0.4 parts by weight of glycidyl methacrylate: Blenmer G manufactured by Nippon Oil & Fats, Inc. and 0.1 parts by weight of di-tert-butyl peroxide were mixed uniformly by a drum blender.

3. Extruding

A twin-screw extruder, NRII-46 mmSG manufactured by Freesia Macross, Inc., was used.

The constitution was as follows.

L/D=40 in total, and starting from the hopper, the constitution was;

(1) 18 D of feeding and melting section
(2) 6 D of rotor type kneading segments
(3) 4 D of feeding section
   (A second feeding port is placed here. However, it was not used in the examples.)
(4) 4 D of kneading discs
(5) 8 D of discharge section
   (A vent hole is provided at the position of 2 D in this zone, and the zone is degassed with a vacuum pump.).

| Cylinder temperature | 200° C. |
|---|---|
| Screw rotation | 150 RPM |
| Throughput | 50 kg/hr. |

The above-mentioned mixtures were melted, kneaded and extruded according to the conditions set forth above.

The extruded article in the above 1 is hereinafter referred to as 'M-POE-0.2', likewise, the article in the above 2 (1) as 'G-POE-0.2' and the article in the above 2 (2) as 'G-POE-0.4'.

4. Producing a Thermoplastic Polyester Resin Composition with Mixing

The compositions of the present invention were produced under the conditions below with the use of the same extruder as above.

| Cylinder temperature | 250° C. |
|---|---|
| Screw rotation | 200 RPM |
| Throughput | 60 kg/hr |

Melting, kneading and extruding were carried out according to the conditions set forth above.

5. Testing

| | |
|---|---|
| Injection molding machine | J75E11 manufactured by Japan Steel Works, Inc. Cylinder temperature 250° C. |
| Mold | The specimens for ASTM D638 Tensile Test and the specimens for ASTM D790 Flexural Test were molded in a set. Mold temperature 80° C. |

The test results of the mechanical characteristics of thus produced test specimens are shown in Table 1 and 2.

In these tables, PET represents thermoplastic polyester resin, POE represents polyolefin elastomer, M-POE-0.2 represents polyolefin elastomer modified with a carboxylic acid, G-POE-0.2 represents the adduct of 0.2 wt. % of glycidyl methacrylate to polyolefin elastomer and G-POE-0.4 represents the adduct of 0.4 wt. % of glycidyl methacrylate to polyolefin elastomer. In Comparative Example 1, the value 100 on the line of PET shows that PET is 100 wt. %, and in the Comparative Example 2, 80 on PET and 20 on POE shows that PET is 80 wt. % and POE is 20 wt. %. It is to be understood that the numbers in the other examples represent likewise.

The Izod impact strength values were improved little in Comparative Examples 2 and 3 wherein 20 or 30 wt. % of conventional POE is mixed. However, the Izod impact strength values were improved markedly in Examples 1 to 7 wherein 10 or 20 wt. % of the carboxyl-modified POE (M-POE-0.2) or the glycidyl methacrylate adduct to POE (G-POE-0.2, G-POE-0.4) was used, and in particular, over 80 kgf·cm/cm of the values, which is the highest strength of impact resistance among plastic materials, were obtained in the Examples wherein 30 wt. % of the modified POE was mixed. Furthermore, the flexural strengths and flexural moduli were also sufficient values for structural members, and thereby the effect of the present invention was demonstrated.

In regard to the mixing and dispersing of fillers, the pellets produced according to the above method were observed with a microscope. Consequently, no abnormality was confirmed therein. Moreover, it was confirmed that the states of dispersing and mixing were good.

While a preferred form of the present invention has been described above, it is to be understood that the present invention is not limited thereto.

For example, other ingredients may be mixed such as pigments, dyes, heat stabilizers, antioxidants, UV stabilizers, antistatic agents, plasticizers and other polymers.

Additionally, a side chain of polyolefin elastomer may have either more than or less than 6C.

TABLE 1

| Composition | Unit | Comparative Example 1 | Comparative Example 2 | Comparative Example 3 | Example 1 | Example 2 |
|---|---|---|---|---|---|---|
| PET | Wt. % | 100 | 80 | 70 | 90 | 70 |
| POE | Wt. % | | 20 | 30 | | |
| M-POE-0.2 | Wt. % | | | | 10 | 30 |
| G-POE-0.2 | Wt. % | | | | | |
| G-POE-0.4 | Wt. % | | | | | |
| Mechanical property | | | | | | |
| Flexural strength | Kgf/mm$^2$ | 8.8 | 5.0 | 3.9 | 6.7 | 4.5 |
| Flexural modulus | Kgf/mm$^2$ | 252 | 170 | 135 | 210 | 150 |
| Izod impact strength | Kgf·cm/cm$^2$ | 2.6 | 2.5 | 5.0 | 6.7 | 82.3 |

TABLE 2

| Composition | Unit | Example 3 | Example 4 | Example 5 | Example 6 | Example 7 |
|---|---|---|---|---|---|---|
| PET | Wt. % | 80 | 70 | 90 | 80 | 70 |
| POE | Wt. % | | | | | |
| M-POE-0.2 | Wt. % | | | | | |
| G-POE-0.2 | Wt. % | 20 | 30 | | | |
| G-POE-0.4 | Wt. % | | | 10 | 20 | 30 |
| Mechanical property | | | | | | |
| Flexural strength | Kgf/mm$^2$ | 5.4 | 4.2 | 7.0 | 5.5 | 4.4 |
| Flexural modulus | Kgf/mm$^2$ | 173 | 144 | 221 | 183 | 148 |
| Izod impact strength | kgf·cm/cm$^2$ | 12.8 | 82.0 | 7.8 | 11.4 | 73.6 |

What is claimed is:

1. A thermoplastic polyester resin composition, comprising:

70 to 60 parts by weight of a thermoplastic polyester resin; and 30 to 40 parts by weight of a polyolefin elastomer modified by adding 0.05 to 0.4 parts by weight of glycidyl methacrylate to 100 parts by weight of poly olefin elastomer polymerized by using a metallocene catalyst;

wherein said thermoplastic polyester resin is polyethylene terephthalate; and wherein said polymerized polyolefin elastomer is ethylene·α-olefin copolymer having 5 to 30 wt.% based on the weight of the ethylene, of α-olefin comonomer, and the basic structure of said elastomer is represented by the formula $(CH_2-CH_2)_n\cdot(CH_2-CHR)_m$, where R is a side chain represented by the formula $(CH_3\cdot(CH_2)_L$, where L is 3 to 8 inclusive.

* * * * *

UNITED STATES PATENT AND TRADEMARK OFFICE
CERTIFICATE OF CORRECTION

PATENT NO.     : 6,399,695 B1
DATED          : June 4, 2002
INVENTOR(S)    : Moriwaki et al.

It is certified that error appears in the above-identified patent and that said Letters Patent is hereby corrected as shown below:

Column 1,
Line 16, change "moldability." to -- moldability, --
Line 21, change "filers" to -- fillers --

Column 2,
Line 1, change "Claim 1" to -- a first aspect --
Lines 9 and 18, change "Claim 2" to -- a second aspect --
Line 10, change "Claim 1" to -- the first aspect --
Line 17, change "Claim 3" to -- a third aspect --
Line 20, change "ethylene.α-olefin" to -- ethylene-α-olefin --
Line 20, change "hating" to -- having --
Line 23, change "$[CH_2-CH_2]_n.[CH_2-CHR]_m$" to -- $[CH_2-CH_2]_n\cdot[CH_2-CHR]_m$ --
Line 24, change "$CH_3.[CH_2]_L$" to -- $CH_3 \cdot[CH_2]_L$ --
Line 29, change "Claim 4" to -- a fourth aspect --
Line 32, change "Claims 3 and 10" to -- the third aspect and 10 --
Line 45, change "Claim 5" to -- a fifth aspect --
Line 46, change "Claim 4" to -- the fourth aspect --
Line 59, change "Claims 6 to 8" to -- sixth, seventh and eight aspects --
Line 60, change "Claim 2" to -- the second aspect --
Line 61, change "Claims 4 and/or 5" to -- the fourth and/or fifth aspect --
Line 62, change "Claim 9" to -- a ninth aspect --
Line 63, change "Claim 1" to -- the first aspect --

Column 3,
Line 6, "resistance depending" should be -- resistance, depending --
Line 8, change "Claims 10 to 15" to -- tenth to fifteenth aspects --
Line 9, change "Claims 3 to 8" to -- the third to eighth aspects --
Line 12, change "Claims 3 to 8" to -- the third to eight aspects --
Line 13, change "Claim 9" to -- the ninth aspect --
Line 14, change "Claim 2" to -- the second aspect --
Line 15, change "Claim 16" to -- a sixteenth aspect --
Line 26, change "Claims 17 to 30" to -- seventeenth to thirtieth aspects --
Lines 27 and 30, change "Claims 2 to 15" to -- the second to fifteenth aspects --
Line 31, change "Claim 16" to -- the sixteenth aspect --
Line 32, change "Claim 1" to -- the first aspect --

UNITED STATES PATENT AND TRADEMARK OFFICE
CERTIFICATE OF CORRECTION

PATENT NO. : 6,399,695 B1
DATED : June 4, 2002
INVENTOR(S) : Moriwaki et al.

It is certified that error appears in the above-identified patent and that said Letters Patent is hereby corrected as shown below:

Column 4,
Line 21, change "hydrogen atom halogen atom." to -- hydrogen atom, halogen atom, --
Line 22, change "(carbon atom)." to -- (carbon atom), --
Line 35, change "group.6" to -- group, 6 --
Line 42, change "disclosed." to -- disclosed, --
Line 43, change "No. 4." to -- No. 4, --
Line 57, change "… catalysts. The metallocene .." to -- ...catalysts. The metallocene... --
Line 58, change "elastomer." to -- elastomer, --

Column 5,
Line 42, change "(EPDXI)" to -- (EPDM) --
Line 60, change "acrylic acid. methacrylic acid." to -- acrylic acid, methacrylic acid, --

Column 6,
Line 3, change "grafting Lauroyl" to -- grafting. Lauroyl --
Line 46, change "likewise only" to -- Likewise, only --

Column 7,
Line 16, change "0.1 to 101 in particle" to -- 0.1 to 10$\mu$ in particle --

Column 8,
Line 64, in table change "kg/hr" to -- kg/hr. --

Column 9,
Line 13, change "Table" to -- Tables --
Line 66, change "kgf·cm/cm" to -- kgf·cm/cm$^2$ --

Column 10,
Line 67, change "poly" to -- poly- --

UNITED STATES PATENT AND TRADEMARK OFFICE
CERTIFICATE OF CORRECTION

PATENT NO. : 6,399,695 B1
DATED : June 4, 2002
INVENTOR(S) : Moriwaki et al.

It is certified that error appears in the above-identified patent and that said Letters Patent is hereby corrected as shown below:

Column 12,
Line 3, change "$CH_2 -- CHRhd\ m$" to -- $CH_2 -- CHR)_m$ --

Signed and Sealed this

Twelfth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,399,695 B1
DATED : June 4, 2002
INVENTOR(S) : Moriwaki et al.

It is certified that error appears in the above-identified patent and that said Letters Patent is hereby corrected as shown below:

Column 1,
Line 16, change "moldability." to -- moldability, --
Line 21, change "filers" to -- fillers --

Column 2,
Line 1, change "Claim 1" to -- a first aspect --
Lines 9 and 18, change "Claim 2" to -- a second aspect --
Line 10 and 63, change "Claim 1" to -- the first aspect --
Line 17, change "Claim 3" to -- a third aspect --
Line 20, change "ethylene.α-olefin" to -- ethylene-α-olefin --
Line 20, change "hating" to -- having --
Line 23, change "$[CH_2-CH_2]_n.[CH_2-CHR]_m$" to -- $[CH_2-CH_2]_n \cdot [CH_2-CHR]_m$ --
Line 24, change "$CH_3.[CH_2]_L$" to -- $CH_3 \cdot [CH_2]_L$ --
Line 29, change "Claim 4" to -- a fourth aspect --
Line 32, change "Claims 3 and 10" to -- the third aspect and 10 --
Line 45, change "Claim 5" to -- a fifth aspect --
Line 46, change "Claim 4" to -- the fourth aspect --
Line 59, change "Claims 6 to 8" to -- sixth, seventh and eight aspects --
Line 60, change "Claim 2" to -- the second aspect --
Line 61, change "Claims 4 and/or 5" to -- the fourth and/or fifth aspect --
Line 62, change "Claim 9" to -- a ninth aspect --

Column 3,
Line 6, "resistance depending" should be -- resistance, depending --
Line 8, change "Claims 10 to 15" to -- tenth to fifteenth aspects --
Line 9, change "Claims 3 to 8" to -- the third to eighth aspects --
Line 12, change "Claims 3 to 8" to -- the third to eight aspects --
Line 13, change "Claim 9" to -- the ninth aspect --
Line 14, change "Claim 2" to -- the second aspect --
Line 15, change "Claim 16" to -- a sixteenth aspect --
Line 26, change "Claims 17 to 30" to -- seventeenth to thirtieth aspects --
Lines 27 and 30, change "Claims 2 to 15" to -- the second to fifteenth aspects --
Line 31, change "Claim 16" to -- the sixteenth aspect --
Line 32, change "Claim 1" to -- the first aspect --

Column 4,
Line 21, change "hydrogen atom halogen atom." to -- hydrogen atom, halogen atom, --
Line 22, change "(carbon atom)." to -- (carbon atom), --
Line 23, change "alkenyl" to -- aryloxyl --
Line 35, change "group.6" to -- group, 6 --
Line 42, change "disclosed." to -- disclosed, --

UNITED STATES PATENT AND TRADEMARK OFFICE
CERTIFICATE OF CORRECTION

PATENT NO. : 6,399,695 B1
DATED : June 4, 2002
INVENTOR(S) : Moriwaki et al.

It is certified that error appears in the above-identified patent and that said Letters Patent is hereby corrected as shown below:

Column 4 cont.,
Line 43, change "No. 4." to -- No. 4, --
Line 57, change "...catalysts. The metallocene .." to -- ...catalysts. --
Line 58, change "elastomer." to -- elastomer, --

Column 5,
Line 42, change "(EPDXI)" to -- (EPDM) --
Line 60, change "acrylic acid. methacrylic acid." to -- acrylic acid, methacrylic acid, --

Column 6,
Line 3, change "grafting Lauroyl" to -- grafting. Lauroyl --
Line 46, change "likewise only" to -- Likewise, only --

Column 7,
Line 16, change "0.1 to 101 in particle" to -- 0.1 to 10µ in particle --

Column 8,
Line 64, in the table change "kg/hr" to -- kg/hr. --

Column 9,
Line 13, change "Table" to -- Tables --
Line 66, change "kgf·cm/cm" to -- kgf·cm/cm$^2$ --

UNITED STATES PATENT AND TRADEMARK OFFICE
CERTIFICATE OF CORRECTION

PATENT NO. : 6,399,695 B1
DATED : June 4, 2002
INVENTOR(S) : Moriwaki et al.

It is certified that error appears in the above-identified patent and that said Letters Patent is hereby corrected as shown below:

Column 10,
Line 67, change "poly" to -- poly- --

Column 12,
Line 3, change "$CH_2$ -- CHRhd m" to -- $CH_2$ -- $CHR)_m$ --

Signed and Sealed this

Fourteenth Day of September, 2004

JON W. DUDAS
*Director of the United States Patent and Trademark Office*